United States Patent [19]

Diekman et al.

[11] Patent Number: 4,648,616
[45] Date of Patent: Mar. 10, 1987

[54] FRAME JOINT CONSTRUCTION FOR BICYCLES AND THE LIKE

[75] Inventors: Robert L. Diekman, Kent; V. Daniel Downing, Maple Valley, both of Wash.

[73] Assignee: Huffy Corporation, Dayton, Ohio

[21] Appl. No.: 784,420

[22] Filed: Oct. 4, 1985

[51] Int. Cl.⁴ ............................................. B62K 19/22
[52] U.S. Cl. .................... 280/281 R; 403/265
[58] Field of Search .......................... 280/281 R, 279; 403/265, 266, 267, 268

[56] References Cited

U.S. PATENT DOCUMENTS

| | | | |
|---|---|---|---|
| 681,196 | 8/1901 | Clark | 403/265 |
| 932,546 | 8/1909 | Hedstrom | 280/281 R |
| 1,433,860 | 10/1922 | Spencer | 403/267 |
| 3,030,124 | 4/1962 | Holloway | 280/281 R |
| 3,999,786 | 12/1976 | Powondra | 403/268 |
| 4,145,068 | 3/1979 | Toyomasu | 280/281 R |

FOREIGN PATENT DOCUMENTS

| | | | |
|---|---|---|---|
| 3112081 | 10/1982 | Fed. Rep. of Germany | 280/281 R |
| 1019679 | 1/1953 | France | 280/281 R |
| 8204520 | 3/1982 | France | 280/281 R |

Primary Examiner—John A. Pekar
Attorney, Agent, or Firm—Biebel, French & Nauman

[57] ABSTRACT

A frame joint for bicycles and the like includes a stub insert consisting of a base, a stub protruding from the base, and an annular shoulder at the junction between the base and the stub; a connecting member having a tubular end with an annular end face telescoping over the stub in a press fit; adhesive bonding the tubular end to the stub; and an annular collet positioned on the stub between the end face and the shoulder. The collet includes an inner end having a first lip portion which extends about and overlaps a periphery of the base adjacent to the shoulder and an outer end having a second lip portion which is beveled in a concave fashion to overlap and receive the end face of the connecting member. The first and second lip portions are joined by a continuous outer wall having a diameter greater than that of the tube end and the base, and an interior wall extending between the first and second lip portions having a diameter less than that of the tube end and base.

15 Claims, 5 Drawing Figures

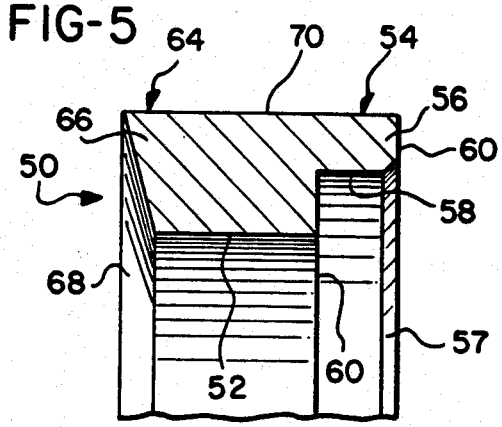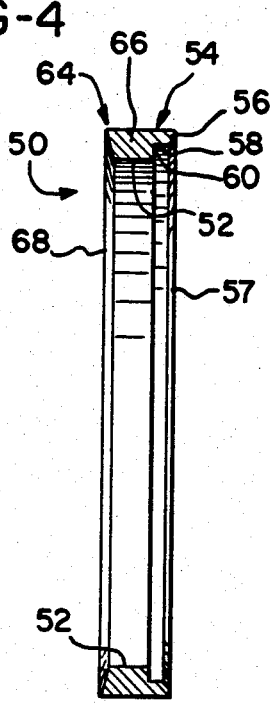

FRAME JOINT CONSTRUCTION FOR BICYCLES AND THE LIKE

BACKGROUND OF THE INVENTION

The present invention relates to joint construction particularly suitable for bicycle frames and the like and, more particularly, to joint construction in bicycle frames in which the components are joined by means other than welding or brazing.

The frames for most lightweight touring or racing bicycles comprise a head tube bracket which includes a sleeve for receiving the handlebar and fork stems, a bottom bracket which includes a sleeve for receiving the pedal crank assembly, and a seat bracket which includes an opening for receiving the seat post of the bicycle seat. These three brackets are joined together by tubes to form a triangularly-shaped frame. The tubes are attached to the brackets typically by welding or brazing.

Since the stresses exerted on such bicycle frames during use are concentrated at the head tube bracket, seat bracket, and bottom bracket, these components are made of steel or other strong, metal alloys. However, in order to reduce the overall weight of the frame, it is desirable to make the connecting tubes of aluminum or other alloys which are not as strong as steel, but are much lighter. The use of dissimilar metals in constructing a bicycle frame makes the brazing or welding together of the components difficult if not impracticable. Consequently, other methods of connecting components have been explored.

For example, a bicycle frame is disclosed in the Kleinebenne Gebrauchsmuster No. G 81 17 517.5 in which tubular members are attached to the head tube, bottom bracket, and seat brackets by an adhesive. Each of the brackets includes sockets into which are pressed, soldered or welded tubular "appendages" having tapered ends. The ends of the tubular members are complementarily tapered and sized to slip over the appendages. The inside walls of the tubes and the outside walls of the tapered appendages have roughened surfaces and are secured together by an anaerobic adhesive. The adhesive extends between the overlapping surfaces of the tubes and appendages and solidifies without actually bonding to the surfaces, thereby forming a mechanical interlock.

In one embodiment of that invention, the tubular appendages are cylindrical in shape, rather than tapered, and are mounted within a cylindrical socket formed on the associated connecting component. The socket includes a squared shoulder. The tube is also cylindrical in shape and sized to telescope over the appendage. The tube has a squared end which abuts the squared shoulder of the socket when the two pieces are joined together.

Although this type of connection is suitable for joining together bicycle frame components made of dissimilar materials, and could conceivably be utilized to join non-metallic tubes to metallic connecting components, there are disadvantages with this structure. For example, as a result of normal and unavoidable differences in manufacturing tolerances, a slight difference in the outside diameters of the shoulder and tube end would result in the presence of a sharp, annular edge which may extend partly or completely about the joint. In addition to being unsightly, the sharp edge may present a hazard to the user of the bicycle.

Unavoidable variances in tolerancing which result in the shoulder and tube end being something other than squared would result in the formation of gaps between the two components when joined. Again, this is undesirable since it detracts from the aesthetic impression of the bicycle and may present a safety hazard. In order to remove such sharp edges, it is necessary to manually grind such edges away, or fill any gaps. These manual steps greatly add to the production cost of the resultant bicycle.

Since dissimilar materials commonly have different coefficients of thermal expansion, a tube end and socket made of dissimilar materials may expand or contract at different rates, causing gaps to form or disappear in the joint. Once the bicycle frame has been painted, this relative movement will cause the paint to crack in the area of the joint. In addition to cracking at the joint caused by thermal expansion, cracks may also appear at the joint as a result of stresses imposed upon the bicycle frame during use, or possibly during attachment of other components to the frame, such as the seat or pedal crank assembly.

Accordingly, there is a need for a frame joint construction for bicycles and the like in which the components of the frame are attached by means other than welding or brazing and which produces a strong and alsthetically pleasing joint. Furthermore, there is a need for joint construction which compensates for differing coefficients of thermal expansion of component parts and does not require manual operations to finish the joint.

SUMMARY OF THE INVENTION

The present invention is a joint construction which is particularly adapted for use with frames having tubular components, such as bicycle frames and the like. However, the joint construction is applicable to any frame structure having connecting members with tubular ends, and in which the brackets connecting the members include stubs which are inserted into the tubular ends and are bonded together by an adhesive.

The joint includes a bracket having a stub insert which includes a base with an annular shoulder and a stub extending outwardly from the shoulder, and a connecting member having a tubular end which telescopes over the stub and includes a squared end face.

The joint also includes, an annular collet having an inner end shaped to receive and overlap the shoulder of the base, and an outer end shaped to receive and overlap the end face. By overlapping the end face and shoulder, the collet completely encloses the connection.

The collet compensates for unavoidable out-of-tolerance conditions which result in differing outside diameters of the shoulder and end face, since the collet completely encircles those portions of the stub insert and tube. Therefore, there is no need for grinding the joint after connection, or performing any other manual operation to eliminate rough edges. This same advantage applies to out-of-tolerance conditions which would otherwise result in the formation of gaps between the squared tube end and the squared shoulder of the stub insert and require filling.

Furthermore, should the joint be held together by an adhesive, the collet prevents excess adhesive from oozing from the crack between the tube and shoulder during assembly. The collet also prevents adhesive from oozing as a result of expansion during setting or curing.

The collet is also helpful in preventing surface treating solutions, applied to the frame prior to painting, from entering into the joint and corroding the components from within. In this respect, the collet acts as a gasket, forming a fluid-tight fit with both the tube end and shoulder.

An additional advantage of the joint construction of the present invention is that the collet compensates for differing coefficients of thermal expansion, should the lugged member and tube end be made of dissimilar materials. Relative movement of these components in response to changes in temperature, which would normally cause them to pull apart or otherwise move to crack a finish coat of paint, occurs beneath the collet and does not result in the cracking of paint. Furthermore, tests have shown that the use of the connecting collet eliminates cracks resulting from stresses imposed on the joint during use of a completed bicycle having joints of this design.

In a preferred embodiment of the invention, the inner end of the collet includes a first lip portion which is sized to extend about a periphery of the base adjacent to the shoulder. The first lip portion includes an annular inside wall which contacts the periphery of the base, and a seat, adjacent to the inside wall, which abuts the shoulder. The first lip portion is sized to provide a slip fit with the base at the shoulder so that the collet can be mounted on the base simply by sliding it along the stub insert.

The outer end of the collet includes a second lip portion having an annular, concave, beveled surface. The beveled surface has an outside diameter which is slightly larger than the outside diameter of the tube end face. When joint is assembled, the tube slides over the stub toward the shoulder and the tube end face contacts the beveled surface, pushes the collet toward the base. The concave shape of the beveled surface acts to align the collet with the tube end face automatically during this process, without manual assistance or the use of aligning jigs.

In the preferred embodiment the tube used is sized to form a press fit over the stub, and is bonded to the stub by an adhesive. The collet is self-aligning during a pressing operation, and the press fit keeps the component aligned until the adhesive sets up or cures.

Also in a preferred embodiment, the collet is made of a material which is softer than the materials used to construct the stub insert and tube end face. During construction of the joint, the shoulder of the stub insert and the tube end face, when compressed against the collet, will seat themselves and slightly deform the collet material to provide a joint which is free of gaps.

Accordingly, it is an object of the present invention to provide a joint construction which eliminates sharp edges caused by out-of-tolerance conditions between connecting components of the joint; a joint construction which eliminates the formation of cracks in the finish paint resulting from differing coefficients of thermal expansion or stresses imposed on the joint during use; and a joint construction which can be effected with a minimal amount of manual assistance.

Other objects and advantages of the invention will be apparent from the following description, the accompanying drawings, and the appended claims.

BRIEF DESCRIPTION OF THE DRAWINGS

FIG. 4 is a side elevation in section of the collet shown in FIG. 2; and

FIG. 5 is an enlarged detail showing a section of the collet of FIG. 4.

DETAILED DESCRIPTION OF THE PREFERRED EMBODIMENT

Figure 1:
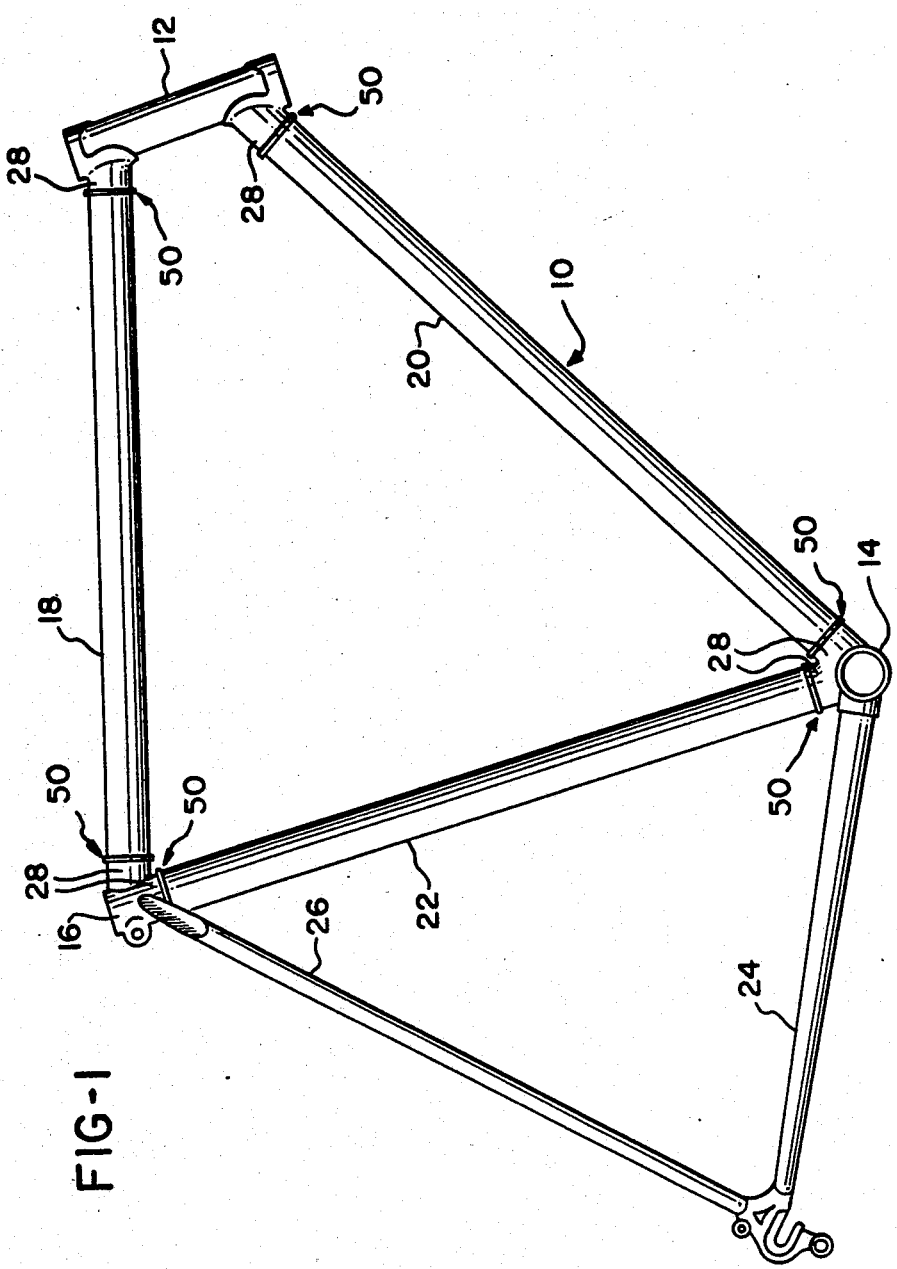
FIG. 1 is a side elevation of a bicycle frame incorporating a preferred embodiment of the joint construction of the present invention.

As shown in FIG. 1, a bicycle frame, generally designated 10, includes three lugged members consisting of a head tube bracket 12, a bottom bracket 14, and a seat bracket 16. The head tube bracket 12 is of the type adapted to pivotally receive a handlebar stem (not shown) in its upper end and a fork stem (not shown) in its lower end. The bottom bracket 14 is of the type adapted to rotatably receive a crank assembly (not shown), and the seat bracket 16 is of the type adapted to receive a seat post (not shown) therein. The frame 10 is similar in construction to the frame disclosed in the application of R. L. Diekman et al., U.S. Ser. No. 677,707, filed Dec. 4, 1984, now U.S. Pat. No. 4,583,755, and commonly assigned, the disclosure of which is incorporated herein by reference.

The head tube bracket 12 and seat bracket 16 are joined by a top tube 18, the head tube and bottom bracket 14 are joined by a down tube 20, and the seat bracket and bottom bracket are joined by a seat mast 22. The tubes 18, 20, 22 are each hollow and substantially cylindrical in shape.

The frame 10 also includes a pair of chain stays 24 which extend rearwardly from the bottom bracket 14 and a pair of seat mast stays 26 which extend downwardly and rearwardly from the seat bracket 16. The chain stays 24 and seat mast stays 26 are attached to their respective brackets 14, 16 by brazing and, in this respect, the frame 10 is similar in construction to many high-quality racing and touring bicycle frames. However, the chain stays 24 and seat mast stays 26 may be attached to their respective brackets 14, 16 in the same manner as the connections between the tubes 18, 20, 22 and the brackets 12, 14, 16 which will be described hereinafter without departing from the scope of the invention.

Each of the brackets 12, 14, 16 includes a pair of stub inserts 28, part of which is shown in broken lines in FIG. 1. The structures of the stub inserts 28 of the brackets 12, 14, 16 are identical, as are the structures of the connections between the tubes 18, 20, 22 and the brackets. Accordingly, the following description of the structure of the joint constructions of the frame 10 will be described with reference only to the connection between the top tube 18 and head tube bracket 12, with the understanding that this description applies equally to the other components and connections of the frame.

Figure 2:
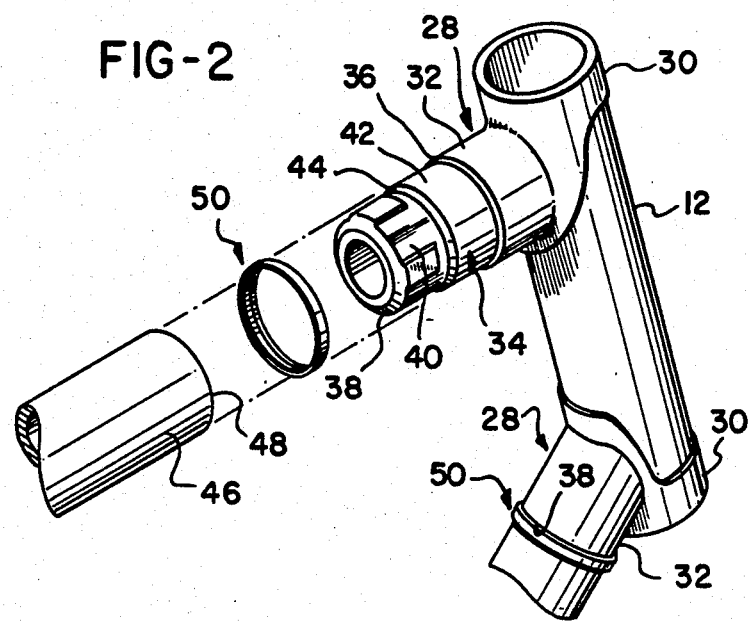
FIG. 2 is a detail in perspective of the head tube bracket of the frame of FIG. 1, showing the joint of the present invention in which the top tube bracket is exploded away from its associated stub insert and in which the collet is positioned between the head tube and the stub insert.
Figure 3:
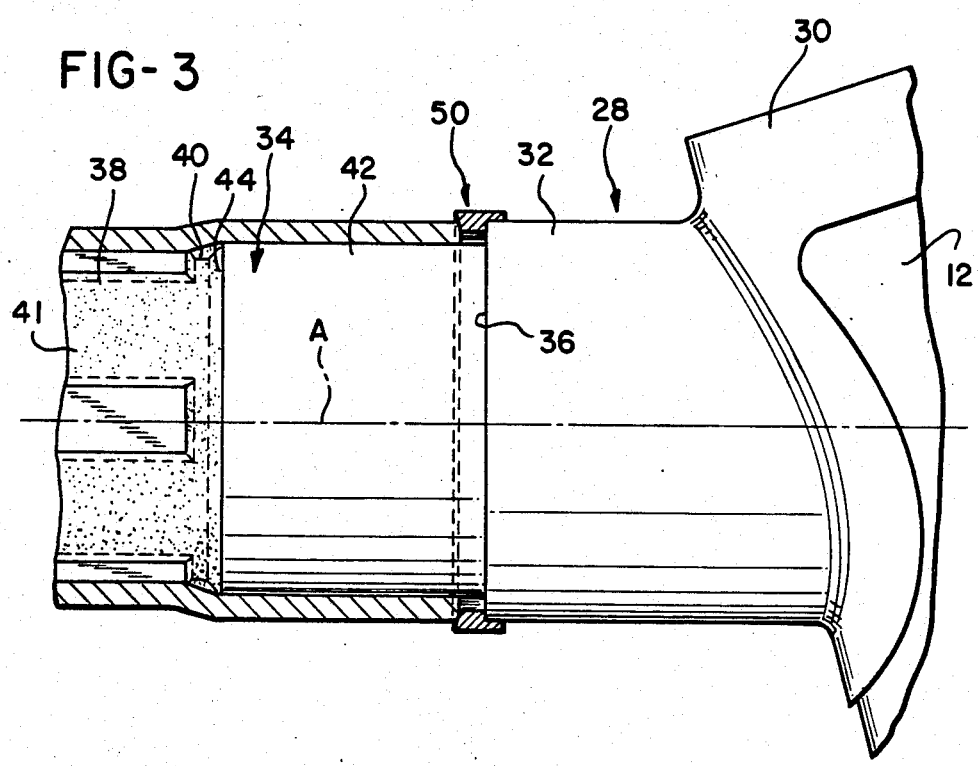
FIG. 3 is a side elevation of the detail of FIG. 2 in which the top tube and collet are in section.

As shown in FIGS. 2 and 3, the stub inserts 28 are integral with the head tube 12 and include lugs 30, which are attached to the head tube by welding, brazing or adhesive, and cylindrical, socket-shaped bases 32. Stubs 34 are positioned within the bases 32 and are attached by a press fit. Each stub 34 has an outside diameter which is less than that of its associated base 32, which forms and annular, squared shoulder 36 at the connection between the stub and the base.

The stubs 34 include a pilot portion 38 having recesses 40 for carrying an adhesive 41, and a main portion 42 positioned adjacent to the shoulder 36. The pilot portion 38 has a diameter which is less than that of the main portion 42 and is separated from the main portion by a frustoconical section 44.

The tube 18 has tubular end 46 which terminates in a squared end face 48. Although the tubes 18, 20, 22 are shown as being cylindrical, only the ends 46 need to be cylindrical to telescope over the stubs 34. The end face has an inside diameter which is sized to provide a slip fit over the pilot portion 38 and an interference or press fit over the main portion 42.

A collet 50 is mounted on the stub 34 and is positioned between the end face 48 and the shoulder 36. As shown in FIGS. 4 and 5, the collet is annular in shape and includes an interior wall 52 which is sized to provide a slip fit with the main portion 42 of the stub 34. The inner end 54 of the collet 50 includes a first lip portion 56 which is defined by an annular inside wall 58 and a seat 60. The inner end 54 is adapted to receive the base 32 of the stub insert 28, with the inside wall 58 having a diameter sized to provide a slip fit over the portion of the base 32 immediately adjacent to the shoulder 36, and the seat 60 is positioned to abut the shoulder 36, as shown in FIG. 3. The end 62 of the first lip portion 56 has a chamfer 57 broken at its connection with the inside wall 58 to eliminate the likelihood of burrs or slight out-of-tolerance conditions preventing the collet 50 from receiving the base 32 within its first lip portion.

The outer end 64 of the collet 50 includes a second lip portion 66 which consists of an annular, concave, beveled surface 68. The term "concave" is used to describe the fact that the surface 68 slopes radially inwardly from the second lip portion 66 toward the inner end 54 of collet 50, and is shown in FIGS. 4 and 5 as a straight, rather than a cupped, bevel.

The outermost tips of the inner and outer ends 54, 64 are joined by a continuous outer wall 70, which is substantially parallel to the interior wall 52. Both the interior wall 52 and outer wall 70 are substantially parallel to a central, longitudinal axis A of the stub 34.

The assembly of the joint is as follows. The collet 50 is slid over the stub 34 until the inner end 54 is adjacent to the shoulder 36 of the base 32. The pilot portion 38 is coated with a suitable metal adhesive 41 (see FIG. 3), such a Permabond ESP Grade 110, manufactured by National Starch & Chemical Corp., Englewood, N.J. The end 46 of the tube 18 is inserted over the pilot portion 38 until it contacts the frustoconical section 44. The tube end 46 is then pressed over the main portion 42 of the stub 34 and expands slightly, and continues sliding until it engages the beveled surface 68 of the collet 50.

Continued displacement of the tube end 46 causes the shoulder 36 to be driven into the recess formed by the inside wall 58 and seat 60 of the first lip portion 56, until the shoulder abuts the seat 60. As this displacement occurs, the end face 48 contacts the beveled surface 68 of the second lip portion 66. The shape of the beveled surface 68 ensures that the collet 50 maintains proper alignment with the squared end 48 of the tube 18.

In order for this self-aligning action to occur, it is necessary that the outer diameter of the beveled surface 68 be greater than the outer diameter of the end face 48 of the tube end 46, so that the end face contacts the beveled surface along the entire periphery of the beveled surface. Furthermore, a beveled surface 68 having a greater diameter than the outside diameter of the end face 48 will allow the collet 50 to overlap the tube end 46 slightly when the joint is made.

Similarly, the first lip portion 56 of the inner end 54 overlaps the base 32 adjacent to the shoulder 36. Thus, both the squared shoulder 36 and end face 48 are enclosed by the collet, and any gaps resulting from out-of-tolerance conditions are covered beneath the outer wall 70 of the collet.

As shown in FIG. 3, once the joint has been formed, there is no need for subsequent manual operations of sanding or filling gaps. Although the pressing operation may be performed substantially by hand, the joint construction of the present invention is particularly well-suited for automated assembly utilizing devices such as that for assembling bicycle frames disclosed in the co-pending application of R. L. Diekman, U.S. Ser. No. 770,801, filed Aug. 29, 1985, and commonly assigned.

This process for attaching tube ends to stubs is repeated for all of the joints of the frame 10. When completed, the press fits are sufficiently strong to allow the frame to be transported to a heat curing chamber, without the compounds becoming misaligned.

In the preferred embodiment, a tube 18 having a wall outside diameter of 1.250 inches (31.75 mm) and an inside wall diameter of 1.152 inches (29.26 mm) is pressed over a stub insert 34 having a main portion 42 with an outside diameter of 1.160 inches (29.46 mm). The collet 50 is sized to have an outside diameter of 1.295 inches (32.89 mm) and an inside wall 56 diameter of 1.256 inches (31.90 mm). The outside diameter of the base 32 immediately adjacent to the shoulder 36 is approximately 1.250 inches (31.75 mm), so that the diameter of the collet 500 exceeds the diameters of the tube 18 and base 32 by approximately 0.040 inches (1.02 mm), so that the collet protrudes beyond the adjacent components by only 0.020 inches (0.51 mm).

In the preferred embodiment, the brackets are made of steel, such as a 1018 or 4130 steel. The connecting tubes 18, 20, 22 are made of a hardened aluminum, such as a 2024-T3 or 6061-T8 aluminum. The collet 50 is made of aluminum which is softer than the materials comprising either the lugged members or the connecting tubes, such as a 6061-T6 aluminum.

While the form of apparatus herein described constitutes a preferred embodiment of this invention, it is to be understood that the invention is not limited to this precise form of apparatus, and that changes may be made therein without departing from the scope of the invention.

What is claimed is:

1. For use with a frame of the type including tubular components connected at ends thereof by bracket means, joint construction comprising:
   stub insert means adapted to be attached to bracket means, said stub insert means including base means with a substantially annular shoulder and stub means extending outwardly from said shoulder;

means having a tubular end telescoping over said stub means and terminating in a substantially annular end face opposing said shoulder; and collet means positioned on said stub means between said shoulder and said end face, said collet means having an inner end engaging said shoulder and including a first lip portion shaped to extend about and overlap a periphery of said base means adjacent to said shoulder, and an outer end engaging said end face and including a second lip portion shaped to extend about and overlap a periphery of said tubular end adjacent to said end face.

2. The joint of claim 1 wherein said first lip portion is substantially annular in shape and includes an annular inside wall contacting said periphery of said base means; and a seat, adjacent to said inside wall, abutting said shoulder.

3. A frame for a bicycle or the like of the type having at least one lugged member including a stub insert, said stub insert having base means with a substantially annular shoulder and stub means extending outwardly therefrom, and means having a tubular end telescoping over said stub and terminating in a substantially annular end face, the improvement comprising:

a collet positioned on said stub means between said shoulder and said end face, said collet having an inner end shaped to receive said shoulder, and an outer end shaped to receive said end face;

said inner end including a first lip portion sized to extend about and overlap a periphery of said base means adjacent to said shoulder;

said outer end including a second lip portion sized to extend about and overlap a periphery of said tubular end adjacent to said end face;

said first lip portion being substantially annular in shape and including an annular inside wall contacting said periphery of said base, and a seat, adjacent to said inside wall, abutting said shoulder; and said second lip portion including an annular, concave, beveled surface engaging said end face.

4. The frame of claim 3 wherein said collet is made of a material which is softer than the materials comprising said base means and said tubular end.

5. For use with a frame of the type including tubular components connected at ends thereof by bracket means, a joint construction comprising:

stub insert means adapted to be attached to bracket means, said stub insert means including base means having a substantially annular, squared shoulder and stub means extending outwardly from said shoulder;

means having a tubular end telescoping over said stub means in a press fit and terminating in a substantially annular, squared end face;

adhesive means binding said tubular end to said stub means; and collet means positioned on said stub means between said shoulder and said end face, said collet means having an inner end including a first lip portion sized to extend about and overlap a periphery of said base means adjacent to said shoulder, said first lip portion including an inside wall extending about and contacting said periphery and a seat adjacent to said inside wall abutting said shoulder; and an outer end including a second lip portion on an opposite end of said collet from said first lip portion and having an annular, concave, beveled surface engaging said end face, said first and second lip portions forming a continuous outer wall having a diameter greater than diameters of said tubular end and said base adjacent to said shoulder and a length sufficient to overlap said base means and said tube end; and an interior wall forming an opening shaped to telescope over said stub means.

6. A frame for a bicycle or the like of the type having at-least one lugged member incuding a stub insert, said stub insert having a cylindrical base with an annular, squared shoulder and a cylindrical stub extending outwardly therefrom, a cylindrical tube having an end telescoping over said stub in a press fit and terminating in an annular, squared end face, and adhesive means bonding said tube end to said stub, the improvement comprising:

a collet positioned on said stub between said shoulder and said end face, said collet having an inner end including a first lip portion sized to extend about and overlap a periphery of said base adjacent to said shoulder, said first lip portion including an inside wall extending about and contacting said periphery and a seat adjacent to said inside wall abutting said shoulder; an outer end including a second lip portion on an opposite end of said collet from said first lip portion and having an annular, concave, beveled surface engaging said end face, said first and second lip portions forming a continuous outer wall having a diameter greater than diameters of said tube end and said base adjacent to said shoulder and a length sufficient to overlap said base and said tube end; and an interior wall forming an opening shaped to telescope over said stub.

7. The bicycle of claim 6 wherein said beveled surface makes an angle of about 85° with a central longitudinal axis of said collet.

8. The bicycle of claim 6 wherein said collet is made of a material which is softer than the materials comprising said shoulder and said tube end.

9. For use with a frame of the type including tubular components connected at ends therof by bracket means, a joint construction comprising:

stub insert means adapted to be attached to bracket means, said stub insert means including base means with a substantially annular shoulder and stub means extending outwardly from said shoulder;

means having a tubular end telescoping over said stub means and terminating in a substantially annular end face; and collet means positioned on said stub means between said shoulder and said end face, said collet means having an inner end engaging said shoulder, and an outer end engaging said end face;

said inner end including a first lip portion sized to extend about a periphery of said base means adjacent to said shoulder;

said outer end including a second lip portion sized to extend about a periphery of said tubular end adjacent to said end face, said end face, said second lip portion including an annular, concave, beveled surface engaging said end face; and said first lip portion being substantially annular in shape and including an annular inside wall contacting said periphery of said base means and a seat, adjacent to said inside wall, abutting said shoulder.

10. The joint of claim 9 wherein said first and second lip portions form a continuous outer wall having a length sufficient to overlap said base means and said tube end.

11. The joint of claim 10 wherein said collet means includes an interior wall forming an opening shaped to telescope over said stub in a slip fit.

12. The joint of claim 11 wherein said interior wall has a diameter less than outside diameters of said tubular end and said base means.

13. The joint of claim 12 wherein said interior wall extends from said beveled surface to said seat.

14. The joint of claim 11 wherein said outer wall has a diameter greater than outside diameters of said tubular end adjacent to said end face and said base means adjacent to said shoulder.

15. The joint of claim 9 wherein said collet means is made of a material which is softer than materials comprising said base means and said tubular end.

* * * * *